A. S. Layton,
Bee Hive.
No. 86,765.  Patented Feb. 9, 1869.
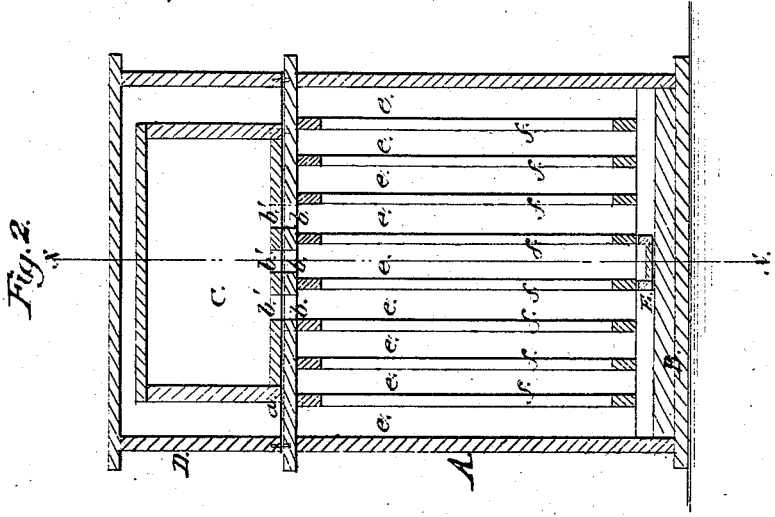
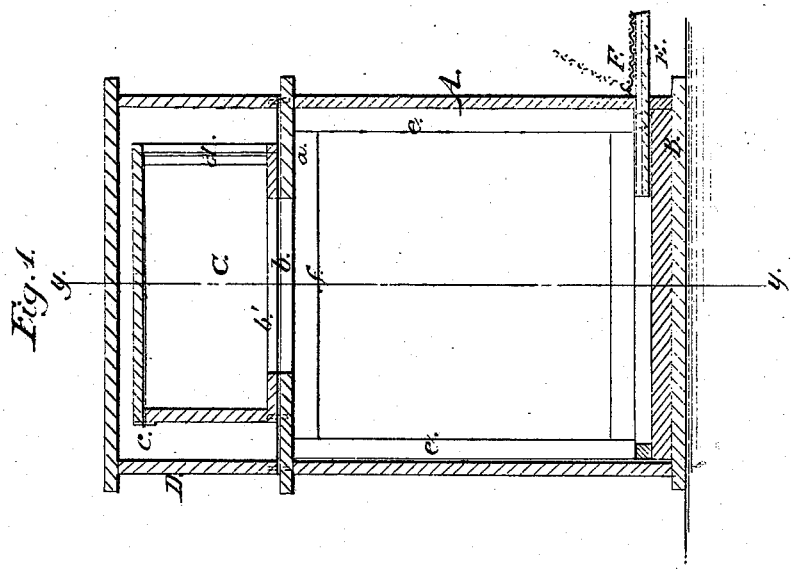
Witnesses:
Inventor:
A. S. Layton

A. S. LAYTON, OF YELLVILLE, ARKANSAS.

Letters Patent No. 86,765, dated February 9, 1869.

IMPROVEMENT IN BEE-HIVES.

The Schedule referred to in these Letters Patent and making part of the same.

*To all whom it may concern:*

Be it known that I, A. S. LAYTON, of Yellville, in the county of Marion, and State of Arkansas, have invented a new and improved Bee-Hive; and I do hereby declare that the following is a full, clear, and exact description thereof, which will enable others skilled in the art to make and use the same, reference being had to the accompanying drawings, forming part of this specification.

This invention relates to a new and improved bee-hive; and

It consists in a novel construction of the same, as hereinafter fully shown and described, whereby the comb-frames may be readily inserted in the hive and detached therefrom, so that the combs may be rendered very accessible, and the depredations of the bee-moth guarded against.

In the accompanying sheet of drawings—

Figure 1 is a vertical section of my invention, taken in the line $x\ x$, fig. 2.

Figure 2 is a vertical section of the same, taken in the line $y\ y$, fig. 1.

Similar letters of reference indicate like parts.

A represents the body or main portion of the hive, which is of quadrilateral form, and of any suitable dimensions, and rests upon a base, B, from which it may be readily removed or detached, when necessary.

The body of the hive is provided with a top, $a$, which has three (more or less) slots, $b$, made through it, to admit of the bees passing up into the spare-honey box C, when necessary, the bottom of the box C being provided with slots, $b'$, similar to $b$, for the bees to pass through.

The box C is provided with a hinged lid, $c$, and has a glass, $d$, at one end, and it is covered by a cap, D, secured in position by dowel-pins, or other equivalent means. Dowel-pins are shown by dotted lines, and the same means may be employed for securing the spare-honey box in position.

To the inner surface of two opposite sides of the body or main portion of the hive there are secured vertical strips or cleats, $e$, with spaces between, of sufficient width to receive the comb-frames $f$, which are shoved upward in the spaces from the bottom of the hive.

These comb-frames may be very readily adjusted in the body A of the hive, and also readily detached or withdrawn therefrom.

To the upper surface of the base, B, of the hive, there is attached a trough, E, which serves as a bee-entrance.

This trough or bee-entrance is provided with a screen, F, which serves as a cover, said screen or cover being attached to A by a hinge or joint, $g$, to admit of it being raised, when desired.

The trough or bee-entrance projects some distance from the hive, as shown clearly in fig. 1, and, while the bees are allowed to pass freely through it, both into and out from the hive, the miller is prevented from passing through it, to deposit her eggs in the hive, and in case of eggs being deposited at the outer end of the trough or passage, the moth may be very readily ejected therefrom, and the screen F may be raised, from time to time, and eggs and moth, should there be any in the passage, removed therefrom.

Having thus described my invention,

I claim as new, and desire to secure by Letters Patent—

The trough or bee-entrance E, attached to the base, B, in connection with the hinged screen or cover F, arranged substantially as and for the purpose specified.

The above specification of my invention signed by me, this 18th day of August, 1868.

A. S. LAYTON.

Witnesses:
W. M. NOE,
W. H. PERRY.